(12) United States Patent
Humadi (10) Patent No.: US 11,058,945 B2
(45) Date of Patent: Jul. 13, 2021

(54) VIRTUAL REALITY ENVIRONMENT OBSERVATION SYSTEM AND NETWORK

(71) Applicant: Roblox Corporation, San Mateo, CA (US)

(72) Inventor: Baker Humadi, Santa Clara, CA (US)

(73) Assignee: Roblox Corporation, San Mateo, CA (US)

(*) Notice: Subject to any disclaimer, the term of this patent is extended or adjusted under 35 U.S.C. 154(b) by 714 days.

(21) Appl. No.: 15/296,485

(22) Filed: Oct. 18, 2016

(65) Prior Publication Data
US 2018/0104580 A1    Apr. 19, 2018

(51) Int. Cl.
| | | |
|---|---|---|
| A63F 9/24 | (2006.01) | |
| A63F 13/00 | (2014.01) | |
| G06F 17/00 | (2019.01) | |
| A63F 13/335 | (2014.01) | |
| A63F 13/79 | (2014.01) | |
| A63F 13/25 | (2014.01) | |
| A63F 13/86 | (2014.01) | |
| A63F 13/35 | (2014.01) | |
| A63F 13/49 | (2014.01) | |
| A63F 13/32 | (2014.01) | |

(52) U.S. Cl.
CPC ............ *A63F 13/335* (2014.09); *A63F 13/25* (2014.09); *A63F 13/35* (2014.09); *A63F 13/49* (2014.09); *A63F 13/79* (2014.09); *A63F 13/86* (2014.09); *A63F 13/32* (2014.09); *A63F 2300/404* (2013.01); *A63F 2300/407* (2013.01); *A63F 2300/8082* (2013.01)

(58) Field of Classification Search
CPC ...................................................... A63F 13/86
See application file for complete search history.

(56) References Cited

U.S. PATENT DOCUMENTS

| | | | |
|---|---|---|---|
| 2013/0024901 A1* | 1/2013 | Sharif-Ahmadi | H04L 41/12 725/114 |
| 2014/0187515 A1* | 7/2014 | Tanaka | A01N 43/78 514/89 |
| 2015/0238875 A1* | 8/2015 | Fear | A63F 13/847 463/33 |
| 2015/0258431 A1* | 9/2015 | Stafford | G06K 9/00382 463/31 |

* cited by examiner

Primary Examiner — Kang Hu
Assistant Examiner — Jason Pinheiro
(74) Attorney, Agent, or Firm — IP Spring (57) ABSTRACT

A virtual reality (VR) system has a server coupled to a data repository and having a processor executing software, a VR game stored in the data repository; and a first network-connected appliance having a display screen, in communication with the network-connected server over the network. The server interacts with the first appliance enabling a user to play a VR game, and prepares a data stream based on the interaction to be streamed to a second computerized appliance, enabling a user of the second computerized appliance to view the activity of a virtual object of the user of the first network-connected computerized appliance as a passive observer from the viewpoint of the avatar, having no control input.

14 Claims, 9 Drawing Sheets

VIRTUAL REALITY ENVIRONMENT OBSERVATION SYSTEM AND NETWORK

BACKGROUND OF THE INVENTION

1. Field of the Invention

The present invention is in the field of virtual reality environment game service and training-service networks and pertains particularly to methods and apparatus for passive or semi-passive association of network-connected observers to a real-time virtual reality environment stream being navigated by a network-connected subscriber.

2. Discussion of the State of the Art

In the art of network-based gaming, traditional point, click, and drag movements to control one's avatar in a simulated or virtual environment are currently being supplanted by use of virtual reality (VR) devices such as VR goggles or glasses for example, often termed head-mounted displays, as input/output devices that allow a player to control navigation by moving the head, hands, eyes, and so on. Such equipment is hard-wired or wirelessly connected to the game terminal and the devices are worn by or at least carried by a user. In a true VR presentation, a user typically does not see her own avatar but sees the other avatars, topology, objects, etc. in the game from the viewpoint of her own, and may interact according to the viewpoint or vantage point of her own avatar.

In a virtual reality game or other simulated three dimensional environments there are large amounts of data associated with the avatars and objects in the environment, including SW that provides generation of display views according to an avatar's movement through and interaction with the environment. Such viewpoints may be floating rather than fixed in position, resulting in visual renderings or views of the VR environment as perceived by the user (avatar) and may be based on user navigation actions including visual direction of the avatar.

It has occurred to the inventor that there may be many uses and advantages in creating viewpoints other than that of a user or a user's avatar engaged in the VR experience. Therefore, what is clearly needed is a VR environment that supports visual monitoring of activity of a subject in a virtual reality environment from a vantage within the game that may be different from the vantage point of the subject or subject's avatar.

BRIEF SUMMARY OF THE INVENTION

In one embodiment of the invention a virtual reality (VR) system is provided, comprising a network-connected server coupled to a data repository and having a processor executing software from a non-transitory medium, a VR game stored in the data repository, and a first network-connected appliance having a display screen, in communication with the network-connected server over the network. The network-connected server streams first data to the first network-connected computerized appliance, and accepts inputs from a user of the first network-connected computerized appliance, enabling the user of the first network-connected computerized appliance to engage in the VR game as an avatar with a variable position and viewpoint, and to fully interact with virtual objects in the VR game, and wherein the network-connected server prepares a second data stream based on the first data stream, the second data stream configured to be streamed to a second network-connected computerized appliance having a display screen, enabling a user of the second network-connected computerized appliance to view the activity of the virtual object of the user of the first network-connected computerized appliance in the VR presentation, as a passive observer from the viewpoint of the avatar, having no control input.

In one embodiment the second data stream is prepared as a video data stream, and the video data stream is streamed to the second network-connected computerized appliance, where the user of the second network-connected computerized appliance views the video stream as a passive observer. Also in one embodiment the second data stream is prepared as a video data stream, and is recorded in a data repository rather than being streamed directly to the second network-connected computerized appliance. Also in one embodiment the recorded video data stream is shared with a plurality of second network-connected computerized appliances. And in one embodiment the video stream is enhanced with 3D data around the position of the avatar of the user of the first network-connected computerized appliance, enabling the observer of the second network-connected computerized appliance to pan the view direction around the position of the avatar.

In one embodiment the observer is enabled to change direction of the observer's view in the VR presentation, but not position relative to the avatar. Also in one embodiment the observer is enabled to change the observer's position relative to the position of the avatar in the virtual environment within pre-programmed limits. In one embodiment the server, executing the software, stores and serves a plurality of VR games at selection of users, maintains user profiles, including Friend relationships, and presents a list to the user of the second computerized appliance upon connection, listing one or more friends of the user of the second appliance, and enables the user of the second appliance to select a game where a friend is playing, and to elect to follow that friend as an observer. In one embodiment the server, executing the software, alerts a user when one of the user's friends enters a VR game at the server, enabling the user to elect to enter the game where the user's friend is playing. And in one embodiment the observer is enabled to communicate in a limited way with the user of the first computerized appliance while following as an observer.

In one embodiment the limited communication comprises verbal input to the user of the first computerized appliance. Also in one embodiment the limited communication comprises textual input to the user of the first computerized appliance. In one embodiment the user of the first computerized appliance is enabled to deny observation to other users. And in one embodiment the user of the first computerized appliance is enabled to limit observation to certain other users.

In another aspect of the invention a virtual reality (VR) system is provided, comprising a computerized appliance having a display screen, input apparatus, a processor coupled to a data repository, and software executing on the processor, and a game engine as part of the software, executing a VR game from the data repository, enabling a user of the computerized appliance to engage in the VR game controlling an avatar with a variable position and viewpoint, and to fully interact with virtual objects in the VR game. The user of the computerized appliance engages in the game as a player, and the game engine simultaneously prepares a video data stream of the activity of the player, and records the video data stream in a data repository coupled to the computerized appliance.

In one embodiment of this system the recorded video is made available to a second computerized appliance having a display screen, input apparatus, and a second processor coupled to a second data repository, and a user of the second computerized appliance is enabled to view the video, following the activity of the player in the VR game from the viewpoint of the avatar, as a passive observer. Also in one embodiment the recorded video is shared with a plurality of second network-connected computerized appliances. Also in one embodiment the video is enhanced with 3D data around the position of the avatar of the user of the first network-connected computerized appliance, enabling the observer of the second network-connected computerized appliance to pan the view direction around the position of the avatar. In one embodiment the observer is enabled to change direction of the observer's view in the VR presentation, but not position relative to the avatar. And in one embodiment the observer is enabled to change the observer's position relative to the position of the avatar in the virtual environment within pre-programmed limits.

DETAILED DESCRIPTION OF THE INVENTION

In various embodiments described in enabling detail herein, the inventors provide a virtual reality (VR) network where individuals may actively observe other individuals engaged in a VR environment such as a VR Gaming or Training session, the observation from the perspective of being included within the environment. The present invention is described in enabling detail using the following examples, which may describe more than one relevant embodiment falling within the scope of the present invention. The present invention is described using the following examples, which may describe more than one relevant embodiment falling within the scope of the invention.

Figure 1:
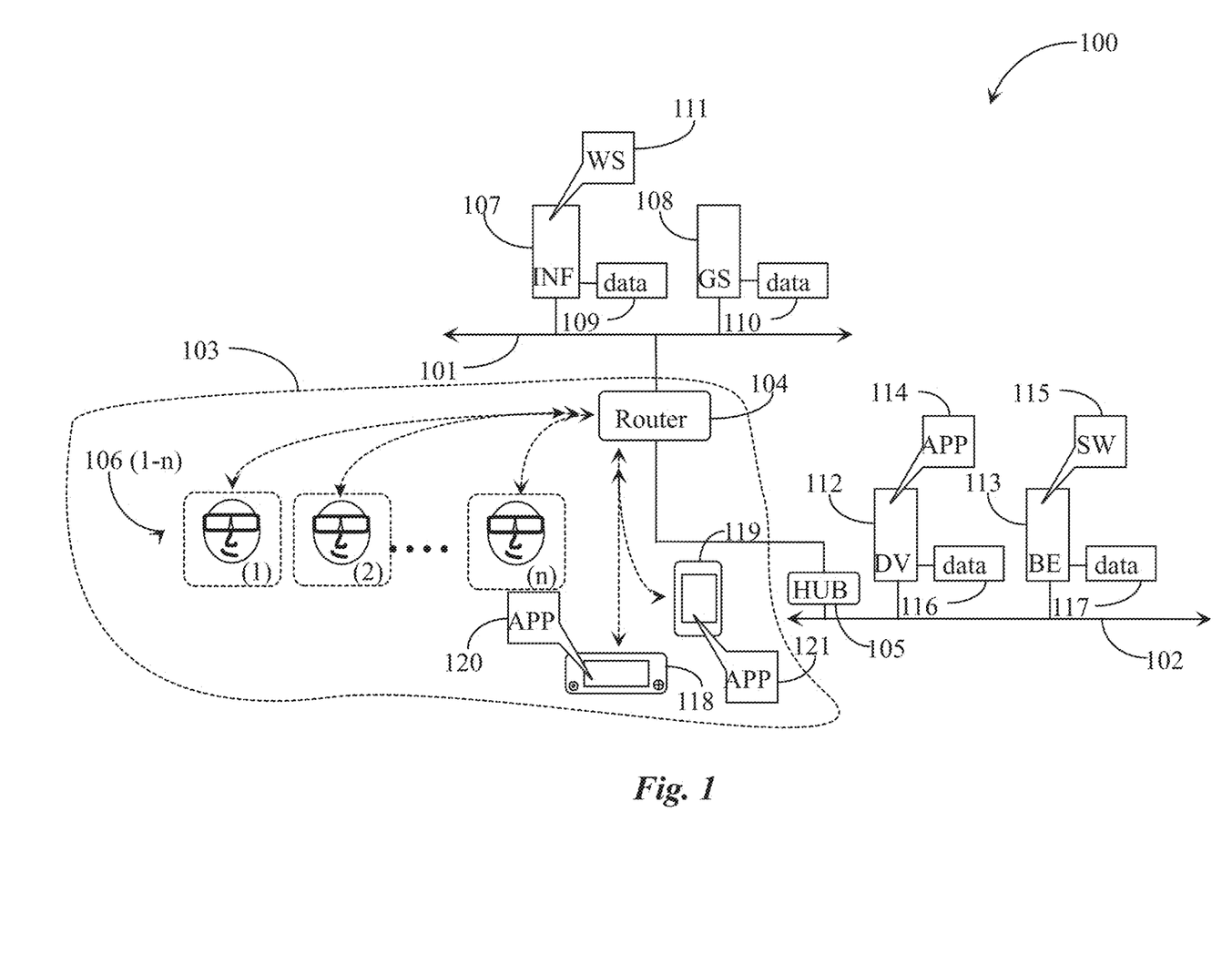
FIG. 1 is an architectural diagram of a gaming network supporting active virtual observation by an individual or group of subject activities in a virtual reality environment.

FIG. 1 is an architectural diagram of a gaming network 100 supporting active virtual observation by an individual or group of subjects active in a virtual reality environment. Gaming network 100 includes the well-known Internet network depicted herein by an Internet backbone 101. Backbone 101 represents all of the lines, equipment, and connection points that make up the Internet as a whole including any connected sub-networks. Therefore, there is no geographic limitation to the practice of the present invention.

Gaming network 100 includes a router 104 having connection to Internet 101, router 104 is adapted to enable sub-networks to gain access to the Internet. In this example, gaming network 100 includes a sub-network 103. Network 103 may be a wireless communications carrier network providing wireless access to Internet 101 to persons connected to the sub-network. Gaming network 100 includes a local area network (LAN) 102. LAN 102 may be a wired network as in this implementation, or may be a wireless network without departing from the spirit and scope of the invention.

LAN 102 may support nodes utilized by a service to provide gaming services to subscribers. In this exemplary architecture, subscribers may include subscribers 106 (1-n) and subscribers 118 and subscriber 119 operating on network 103 and having device access to Internet 101 through router 104. LAN 102 in this example includes a hub 105 that connects LAN 102 to Internet 101 through router 101. Hub 105 may route data from Internet 101 to network-connected nodes operating on LAN 102.

Internet backbone 101 supports an information (INF) server 107 adapted as a Web server for hosting and serving web pages to network connected nodes or devices upon request. Server 107 may be hosted by a third-party web hosting service and may host a Website (WS) 111 of a gaming service provider operating on LAN 102. WS 111 may represent a service contact point for users subscribing to gaming services. Such subscribers may comprise subscribers 106 (1-n) and subscribers 118 and 119 operating in network 103. Server 107 has connection to at least one data repository for holding data about members of the service including customer information, identification, account status, payment history, etc.

Internet backbone 101 supports at least one gaming server (GS) 108. GS 108 may be leased by a gaming service provider in order to host and provide game service to subscribers, such as those operating in network 103. In actual practice gaming servers may be distributed geographically over the larger network to improve latency for subscribers closest to those servers. GS 108 has connection to at least one data repository 110 holding game instances and associated game data for service. Repository 110 may also include business data, regarding such as game authorship, enterprise data (game ownership), and current to historical game activity data as transpired on server 108.

LAN 102 supports a back-end (BE) server 113. Back end server 113 may be hosted by a gaming service provider and may have subscription to data (109) from INF server 107, more particularly data associated with WS 111 including subscriber-ship and use data. Server 113 may subscribe to activity data (110) from GS 108. BE server 113 may have connection to at least one data repository 117. Data repository 117 may hold data received or retrieved from server 107 and from server 108.

BE server 113 may host a software application (SW) 115 which may be adapted to enable inclusion of one or more than one observer into a running instance of a virtual reality environment (game, training module), for the purpose of observing one or more than one subject currently engaged within a virtual environment. An observer may be a person subscribing to the gaming service that may observe what a currently engaged player or training subject is doing (activity), whereby the visual vantage point of the observer is enabled from within the virtual reality environment and associated with the navigational path of the subject being observed as the subject passes through the environment. More detail about observer capabilities is provided later in this specification.

LAN 102 supports a development (DV) server 112. DV server 112 may be dedicated to software developers for developing virtual reality games or training modules. In this regard, server 112 may host a developer application (APP) 114, which may provide user interface capability and software programing tools for building a game or training module. Server 112 includes at least one data repository 116 adapted to hold data associated with game development, including information about members of the gaming service that engage in game building or developing activities. In this fashion, the business entity (game service provider) promotes game creation as well as game play. Certain service subscribers may be software developers interested in producing new games and being compensated for their use by the service provider.

In this implementation, subscribers 106 (1-*n*) represent game service subscribers that are engaged in a virtual reality experience through a game or training module served by GS 108. In this example, subscribers 106 (1-*n*) may have access to VR input and interface devices such as virtual reality headsets or goggles running a VR app (app not illustrated) while connected to the gaming server.

In this environment subscribers 106 (1-*n*) may provide input using head movements, eye movements, body movements, and so on, rather than click and drag navigation as might be the case using a smart phone, Laptop, or standard gaming box with input boards or terminals. In this environment, subscribers do not see their own avatars, but have a visual vantage point of the avatar so that the subscriber sees essentially what the avatar might see, including static and dynamic objects in the game or training module.

Subscribers 118 and 119 may be observers in this implementation. As observers, they may be associated in close proximity (game geography) with respective VR subscribers they may be following. SW 115 running on server 113 may stream display data to subscribers 118 and 119, as observers, through respective gaming client applications (APP) 120 and 121. Apps 120, and 121 may be gaming applications that provide subscribers with a local interface from which to browse games to play, interact with other users, and to browse games or a friends list to see one or more friends or other subscribers that happen to be engaged in a VR session at the time, or may be scheduled to engage at a future date.

In one implementation, the service associates a subscriber who wishes to be an observer to other subscribers that may be engaged in a VR experience. BE server 113 aided by SW 115 subscribes to both the game server and the website data. When a subscriber logs into the Website through an app executing on a device like device 119, for example, BE server 113 may, with the aid of SW 115, note the identity of the subscriber and may access a friends list listing other subscribers to the same gaming service.

BE server 113, aided by software 115 may check on behalf of the subscriber which friends of the subscriber are online and currently engaged or scheduled for a VR session. BE server 113 may publish the information to a subscriber's game page or profile page relative to application 120 or 121. The interface may also be server-hosted instead of hosted on a personal device application. However, a personal application aids users in the gaming experience in general as the app is configured for use with a mobile device.

The subscriber may log-into the website and may then see information about which if any of the subscriber's friends are engaged in a VR session. The subscriber may select one of the friends in a request to the game server to follow that friend while the friend engages in the VR session. The game server may automatically transfer the subscriber into the game as a passive observer who is not playing the game but is visualizing all of the game activity of the friend being observed from a viewpoint in close proximity (such as just overhead or just behind) the avatar associated with the friend. In this way the subscriber may visually experience what the friend is doing in the environment. In some embodiments the observer's viewpoint relative to the object avatar may be configurable. Once an observer is associated with another's avatar, the observer's viewpoint will move in the environment in concert with moves driven by input from the subscriber associated directly with the avatar.

As an observer, the subscriber manipulating his or her device is not manipulating an avatar in the environment, but is manipulating a restricted viewpoint. The observer in some embodiments may be afforded some control over the viewpoint. For example, although the viewpoint of the observer may be constrained to the position of the avatar to which the observer is associated, such as at a point at a certain distance in a certain direction, the subscriber, as observer, may change the view direction within limits, to, for example, look ahead in a direction the avatar may be moving, or to look back to where the avatar has been. In some more sophisticated implementations, the observer may have additional viewpoint control to move the observer's viewpoint to different positions around the associated avatar.

In one embodiment, there may be further capability in the VR environment for enabling the observer to communicate at some level with the subscriber driving the avatar engaged in the VR environment. For example, the observer may be able to insert a text comment or utter a whisper that may be heard by the user engaged in the VR environment. In this implementation the system publishes a list of one or more friends that in real time identifies entries that are reported in the game, and may flag those entries in the list or cut the entries from the main list and present them in a separate list to the observer.

In another embodiment a VR environment may be a training module for police, military, air traffic control, firefighting, and for many other purposes. In such a case an observer may be an authority known to the VR subject such as a supervisor or person that might have advice to give the subject while the subject is actively training. In another variation of the embodiment, an observer may be a novice that desires to observe a more experienced player or subject as they are navigating the VR experience, in order to learn or train. The whisper capability may be added for the observer to ask questions. In still another embodiment, there may be more than one observer assigned to an avatar. In lieu of an avatar representing a person, the system may consider the actual VR subject an avatar and select a set of views for the observer that incorporate all of the visual experience of the gaming party.

Figure 2:
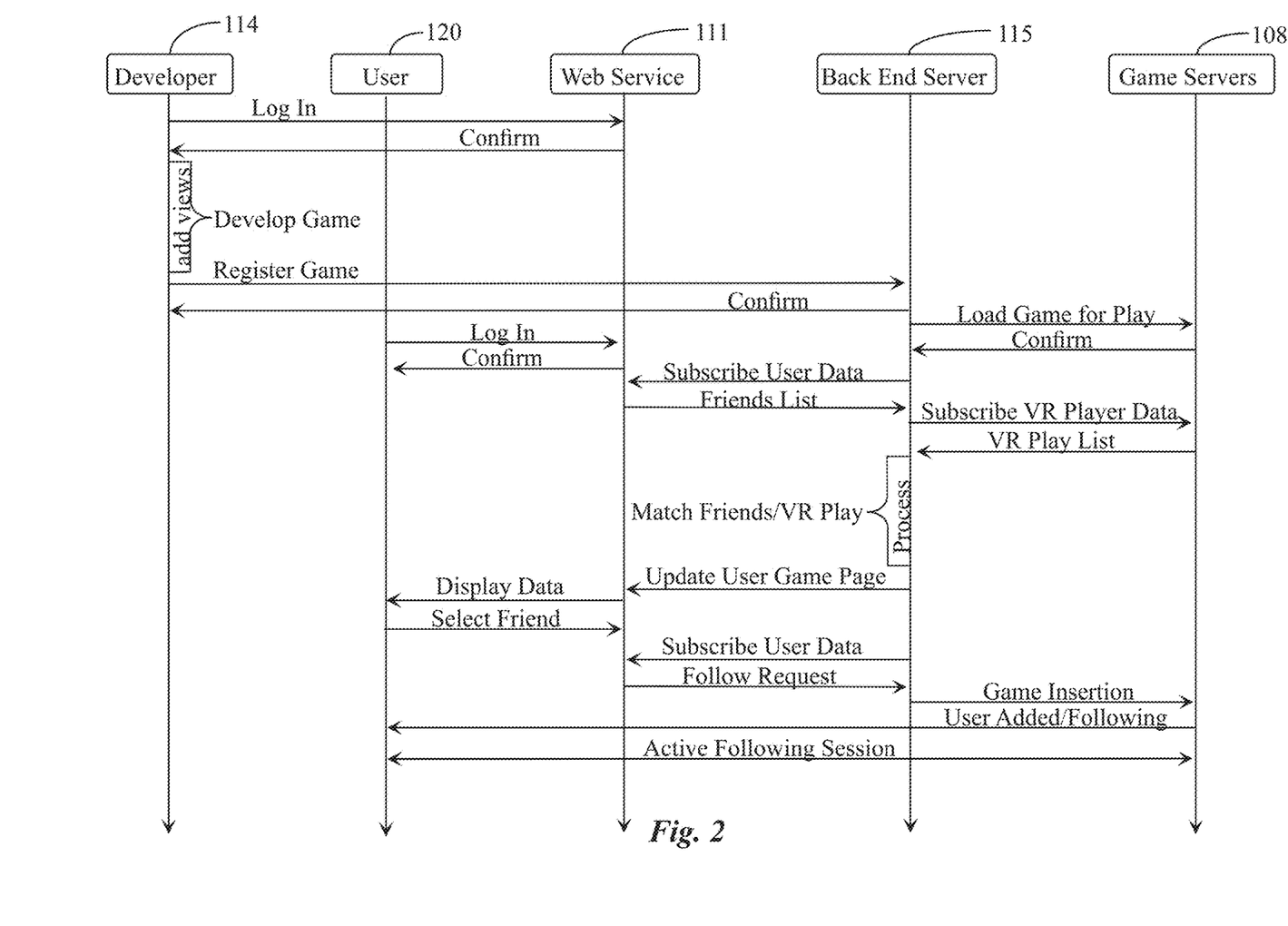
FIG. 2 is a sequence diagram depicting interaction between basic components of the gaming network of FIG. 1.

FIG. 2 is a sequence diagram 200 depicting interaction between basic components of the gaming network of FIG. 1. Diagram 200 depicts a developer node operating application 114. Developer (application) 114 may log in to a Web service (WS) 111, the Web service validating and confirming the state of log-in. In this example it may be that the developer is using game development tools only available through the service. In one embodiment the developer may develop a game off line and register the game after it is ready for play.

During game development, the developer may manage viewpoints covering both static and dynamic data wherein the anchor point and perspective of the viewpoints are fixed at a position relative to a mobile avatar, a position closely associated with the avatar, but not identical to the viewpoint of the avatar. One or more than one avatar that might be in the game may have a capability of accepting one or, in some embodiments, more than one observer. The developer may register the game or training module for service with a back end server 115 of the gaming service providing company.

Back end server (SW) 115 may confirm success in registration to the developer. The registered game may be identified or otherwise marked or flagged as a virtual reality (VR) game that supports insertion of passive observers requesting to observe players in the game, where such players are interacting as an avatar, or another game component. Back end server 115 may forward or upload the VR game developed into a game server 108 for play by subscribers to the gaming service. Game server 108 may confirm the success of upload of the game to the back end server. A user (application) 120 may log into Web service 111 and Web service 111 may confirm successful log-in of the user. Back end server 115 may subscribe to user data from WS 111, more particularly having access to a friend's list of the user and having notification of user online presence after successful log-in.

Back end server (SW 115) may, upon detection of or notification about a subscriber at log-in, may discover friends of the subscriber that are currently engaged in a VR game that supports observers, or that are at least scheduled to participate in the game. Back end server 115 may subscribe to data from GS servers 108. This may be accomplished through a subscription to GS data whereby search of a data repository of a game server is performed using a friends list of the subscriber to determine if any of the subscriber's friends are currently in a VR game hosted on and running on that server.

Once back end server 115 has detected one or more friends of the subscriber engaged in a VR game at a game server, the information may be immediately reported to Web service 111, whereby the service may cause display of the data on the subscriber's mobile device. The data may display in the subscriber's custom game page as transitory or temporary information informing the subscriber of the incidences of online presence of each friend in a particular VR game instance. The information may include the name of the friend, how long the friend has been engaged in the current session, and so on. In one implementation, the presence data may include any of the subscriber's friends who may be scheduled to play a VR game in the future, though they're not engaged at the moment. Moreover, the update may also include historical information informing the subscriber of the recent gaming presence of the subscriber's friends, for example, last log in and session, game name, VR status, length of time played, etc.

A subscriber seeing this activity may select a friend from his or her friends list and request that the subscriber be allowed to observe the friend as the friend navigates through and interacts with the VR environment. The request may be for immediate insertion into a VR game as an observer of the friend, or it may be for a scheduled inclusion should the friend log-in to play at a scheduled time in the future. In one implementation game links advertised on the subscriber's game page may include and indicate information such as the presence of any of the subscriber's friends currently playing the game and whether the game is a VR game.

Back end server 115 subscribes to user data, so once a subscriber has selected a friend to observe in game play, the server receives notification of the request. The request may indicate which friend the subscriber wants to follow. In one implementation, the request to observe a friend identifies a list of friends the subscriber wants to observe, the list ordered according to the priority of the subscriber. For example, I will observe Joe only if Mary is not available for observation. In one implementation the subscriber's engaged friends may prefer that no one observe them, or they may set a level of observation, for example, that excludes the ability to whisper or otherwise communicate with the person being followed.

The game server may add a subscriber as an observer or follower of a friend in an ongoing VR game session resulting in the subscriber passively entering the game and having a viewpoint closely associated with the viewpoint of the friend's avatar or gaming component. If the gaming component is a race car, for example, the subscriber may have a vantage point such as above the car and able to look 360 degrees around the car. The ability of the subscriber to change the direction of view may be one level of observation that may be above a first level where only one viewpoint is enabled. If the friend is a mobile walking avatar the subscriber's viewpoint may be just behind the avatar such that the avatar can be seen and what the avatar sees can be seen. At a higher level, the subscriber may be able to communicate with the friend in a limited way such as being able to whisper short phrases or text short phrases.

Figure 3:
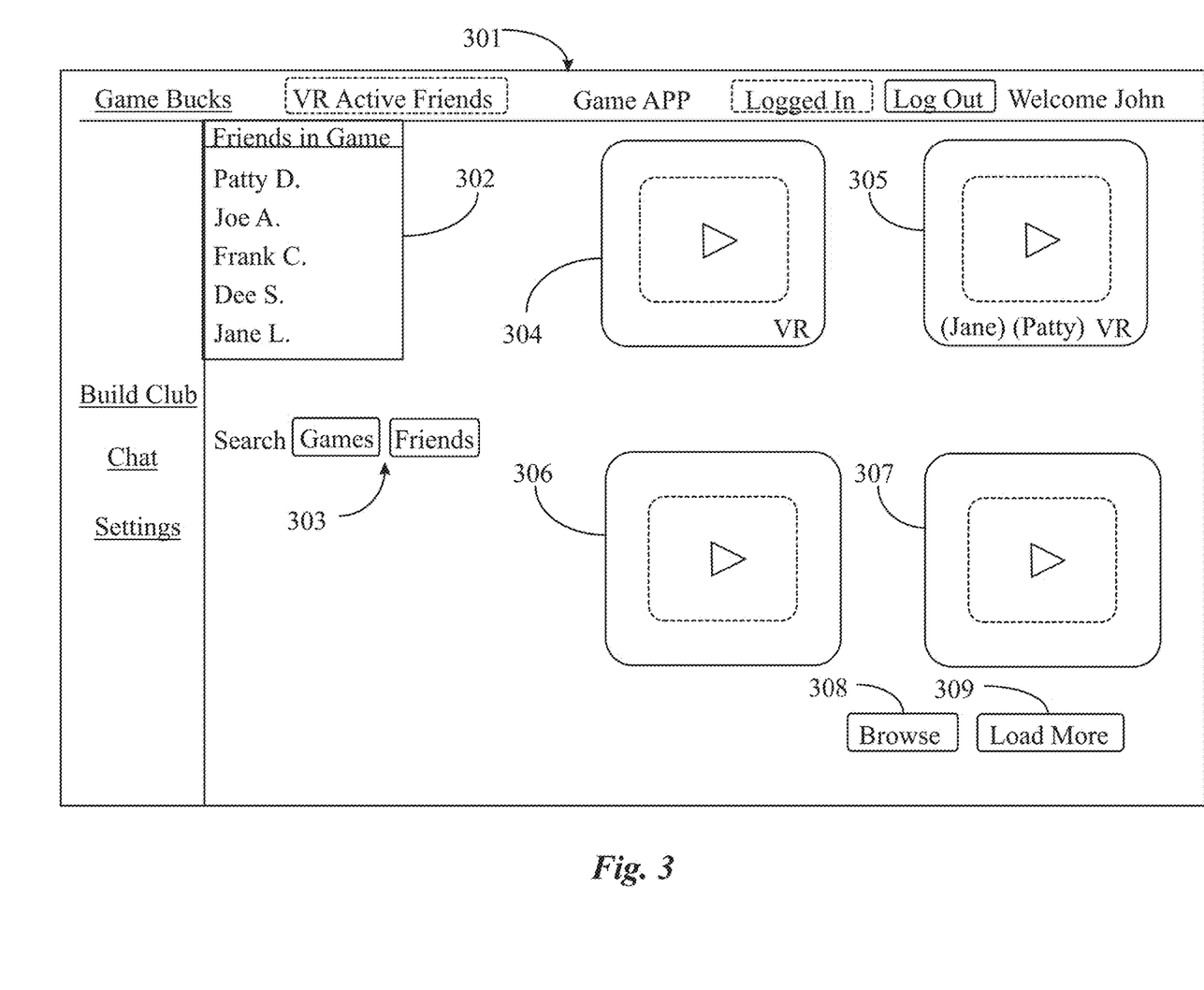
FIG. 3 is a screen shot of a gaming interface page according to an embodiment of the present invention.

FIG. 3 is a simple example illustration of a display of a gaming subscriber interface page of application 120 of FIG. 1 according to an embodiment of the present invention. Application 120 includes a subscriber game play interface page or home page 301. Page 301 includes a title bar with a log in/out link, a link to a virtual account for gaming bucks, and a link to an active VR friends list 302. List 302 includes any of the susbscriber's registered friends that are at the time of viewing, currently engaged in a VR game or environment. In one implementation, the friends in list 302 are all members of a gaming service provider of which the subscriber is also a member. In other implementations the concept may be extended to include other online friends of a subscriber who are not currently members of the gaming site without departing from the spirit and scope of the invention. For example, the subscriber may be an observer that may help a new friend, who is not yet a member of the service, navigate a VR game as an introduction of the game and site to that friend. At the end of play the friend may have an opportunity to sign up for services after free play.

Page 301 may include a sidebar with relevant links such as to a builder club (developers), chat, and settings, including page settings and account settings. There may be other relevant links to other features and services offered by the gaming provider without departing from the spirit and scope of the present invention. In one implementation, a search utility 303 is provided on game page 301 enabling the subscriber to search or browse games and friends. In this case the information included with the game and friend search results may include whether for games there is one or more friends currently engaged or for friends one or more engaged in a game.

In one implementation, game page 301 includes game links to featured games such as link 304, 305, 306, and 307. In this implementation game 304 is a VR game though none of the subscriber's friends are indicated as playing that game. Link 305 shows a VR game where subscriber friends Jane and Patty are engaged in play. Links 306 and 307 represent traditional games not adapted for observing and not necessarily virtual reality games that might support passive observing of a player by one or more other users.

Game page 301 also includes a link 309 for loading more games and a link 308 to browse games that are available for play. Some of these may be VR games having friends engaged while others may not. A subscriber may adjust settings to have all of the VR games with a friend or friends engaged listed first on the custom game page of the subscriber.

In one embodiment, presence information relative to game instances and list of subscriber's friends playing those games is consistently updated at the subscriber's game page while the subscriber is online and connected to the server. In one embodiment, the system automatically updates the subscriber game page periodically. A subscriber may refresh his or her custom game page in order to see friends that are currently engaged in a VR environment.

In one embodiment an observer may be a subscriber who desires to observe an expert navigating the virtual environment, and may pay, such as with virtual currency, for the service to be able to improve understanding of and skill playing a game by observing an expert navigate through the environment. In still another embodiment an observer may be, by virtue of experience, a referee between two persons or subjects playing a VR game where they may be competing against one another according to game rules. There are many possible variations of roles that may be assigned to observers and to those engaged in the environments.

Figure 4:
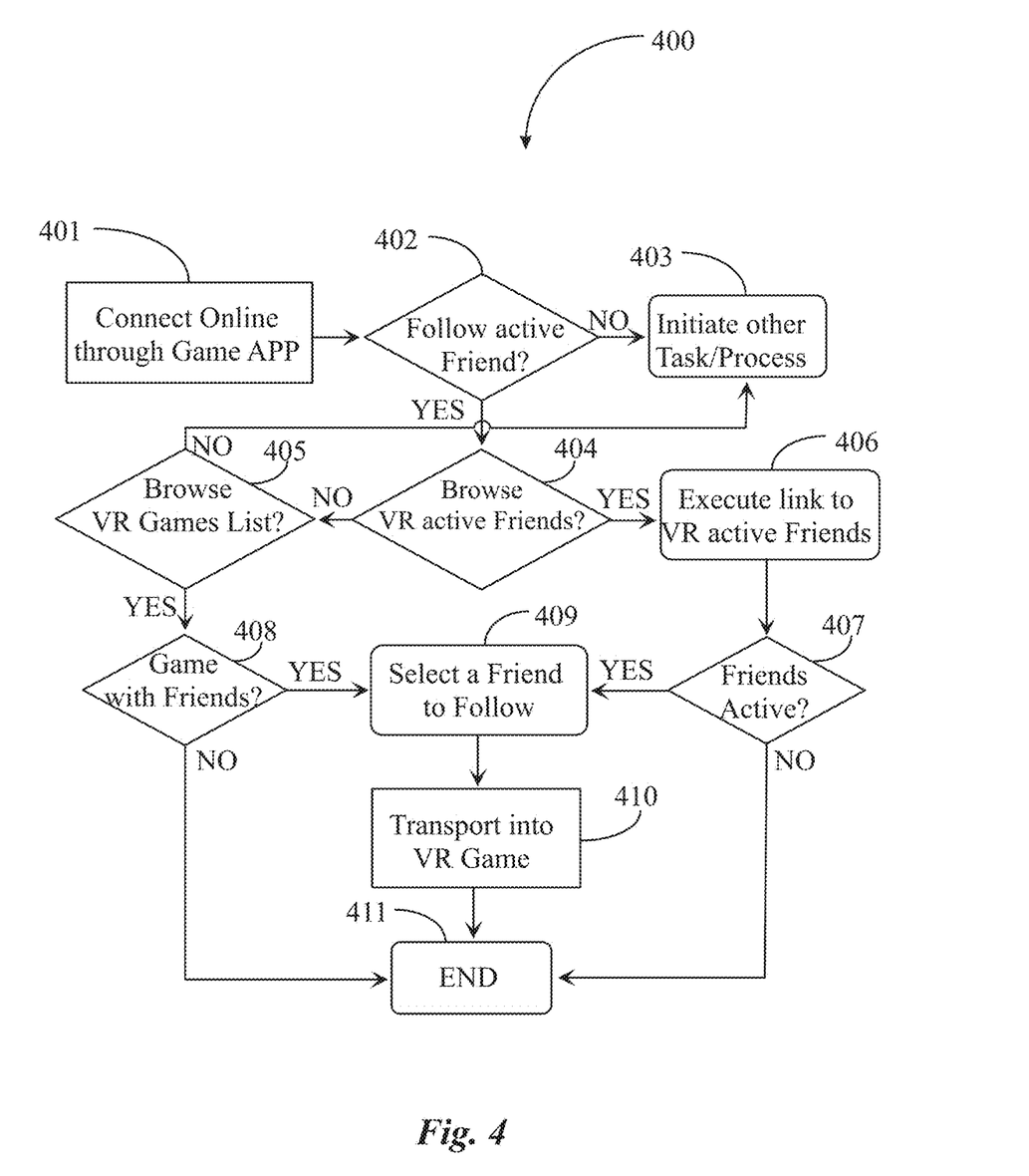
FIG. 4 is a process flow chart depicting steps for following and observing a friend engaged in a virtual reality environment.

FIG. 4 is a process flow chart 400 depicting steps for following and observing a friend engaged in a virtual reality environment. At step 401 a subscriber may connect online through a local gaming application from any mobile or hardwired device that is capable of connecting to and browsing the Internet or a wide area network. An example might be connecting through application 120 or 118 of FIG. 1. A mobile application dedicated to gaming is not required in order to practice the present invention. A mobile application simply provides a better experience for the mobile subscriber and particular operating system on the subscriber's device.

At step 402, the subscriber may make a determination as to whether to follow a friend who may be active in a virtual environment such as in a VR game. If the subscriber determines not to observe a friend active in a VR environment, the process may skip over to step 403 where the subscriber may initiate other tasks or processes available through the gaming application. If the subscriber determines to observe a friend active in a VR environment at step 402, then the subscriber may determine whether or not to browse through a VR active friends list presented in the application at step 404. Such a list may identify all of the subscriber's friends that are determined by the system to be currently active in a VR environment. In one embodiment there may be information associated with each entry on the subscriber's VR-active friends list that reveals to the subscriber how long each of the entries on the list has been engaged with the virtual environment, such as in a VR game.

If the subscriber determines not to browse or select from a friends list of active friends engaged in a VR environment at step 404, the subscriber may determine whether to browse a VR games list to find VR games that one or more of the subscriber's friends are engaged in at step 405. If the subscriber determines not to engage in steps 404 and 405, not necessarily in order, the process may resolve back to step 403 where the subscriber may initiate a different task or process or simply log out of the system.

If the subscriber determines to browse or select from a list of VR active friends at step 404 then the subscriber may execute a link to display all of the subscriber's current VR-active friends at step 406. At step 407 the subscriber may determine visually if there are any active friends in the list. If there are no active friends in the subscriber's list, the process may end for the subscriber at step 411. If the subscriber determines that at least one friend is VR-active at step 407, the subscriber may select a friend or the friend on the list to follow at step 409.

It may be apparent that if there are no VR-active friends flagged or otherwise listed as active, then browsing a list of games would be unnecessary, as no friends are active in those games. However, there may be a reason that a subscriber may determine to browse games rather than a friend list, such as the subscriber only wants to follow a friend relative to a preferred or targeted game. In one implementation the subscriber may request notification when any friends or when particular friends are playing a specific game in which the subscriber wants to follow the friend. In one implementation the service may serve all games to the user interface where at least one friend is engaged in the game. In a larger list the games with friend may be the first ones visible to the subscriber.

If at step 405, if the subscriber determines to browse a VR game list, then the subscriber may determine at step 408 while browsing if there is a game indicating friends of the subscriber engaged in play. If there are no active friends the process may end for the subscriber at step 411. If there is at least one game having at least one friend engaged at step 408, the subscriber may select a friend to follow at step 409. The act of selecting a friend to follow serves to notify the game server hosting the activity to open a connection with the subscriber through the gaming application and to accommodate the user by connecting the user to the avatar of the subscriber's selected friend effectively causing streaming of the visual and audio data from the game where the visual is what the subscriber may see from the available vantage point associated with the avatar.

In one example, a visual vantage point (what the subscriber as an observer may see) may be just above the avatar, just behind the avatar, off to one side of the avatar, and so on. There may or may not be panning capability for the subscriber to adjust or turn the angle of view such as rotating the viewpoint to see behind the avatar. While the subscriber receives real time game feed, the subscriber may not be able to influence in any way the course of the game or the actions of the subscriber's friend in the game.

In another embodiment, there may be a limited involvement by the subscriber such as having a capability of limited communication with the friend, such as a whisper (audio) or text message (visual). In embodiments of the invention a subscriber observing a friend will typically be completely transparent to the friend in the game. Such a case might be where the friend is a test subject and the subscriber is an authority figure that is grading or rating the performance of the test subject's interaction in the virtual environment. After the subscriber is transported into a VR game as an observer in step 410, the process may end for that subscriber at step 411.

In one embodiment, once a subscriber is observing a friend, they may be listed to other friends as VR active. In one case another friend may join an observer that is currently VR active observing a third friend. There may be more than one available view for an avatar besides what the avatar sees where the system publishes availability state. In another embodiment two observers may share one view as the association may be completely passive and both observers may be streamed the same view or in the case of more than one vantage point the correct view for each observer.

In some embodiments a user playing a game may have an indication that he or she is being watched (observed) in the game. This may be done in a variety of ways.

Figure 5:
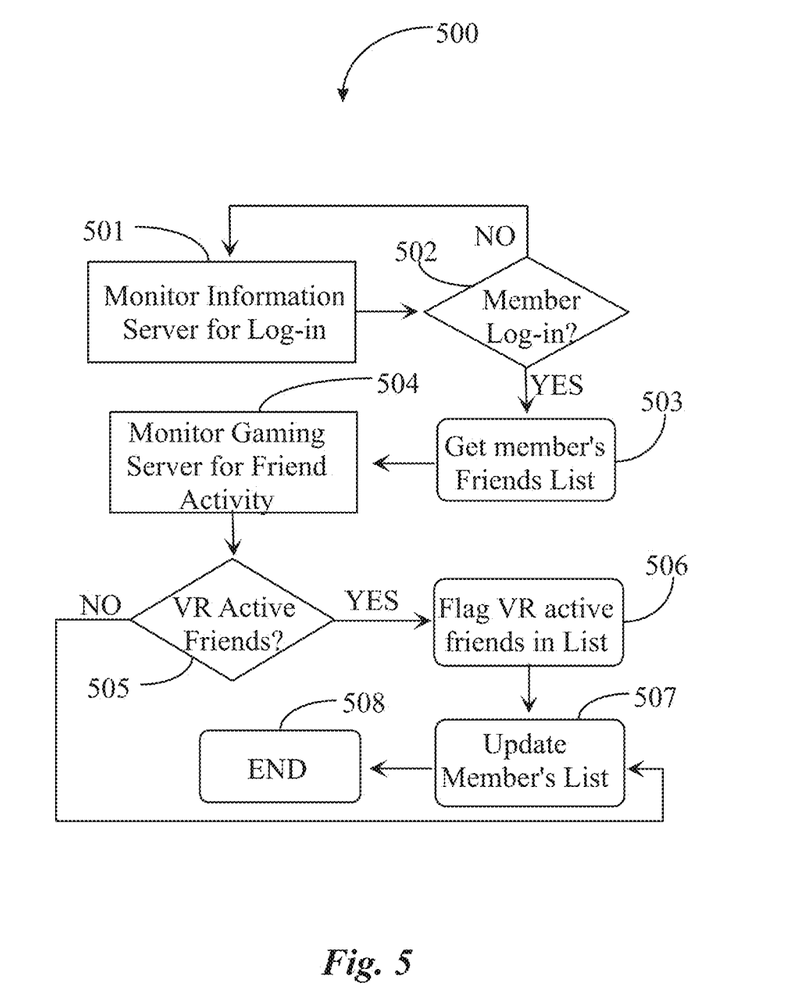
FIG. 5 is a process flow chart depicting steps for determining for a user, which of the user's friends are currently engaged in a virtual reality environment.

FIG. 5 is a process flow chart 500 depicting steps for determining for a subscriber, which of the subscriber's friends are currently engaged in a virtual reality environment. At step 501, members of a gaming service are known to a SW application such as SW 115 running on server 113 of FIG. 1. The SW may be adapted to monitor the information (log-in) server for instances of membership log-in. In another embodiment each time a member of the gaming service website logs in a notification may be sent to the SW application.

At step 502 the application determines if there has been a member log-in event. If the application determines that a member of the service has not logged in the process resolves back to monitoring or listening (notification) at step 501. If the application determines that a member has logged in at step 502, the application may retrieve the member's current friends list at step 503. A member's friends list may comprise all of the other members that the logged-in member has virtually friended through a SW-based friending mechanism or application available to the members. It is noted that in one implementation observers and VR-active members may be assigned to one another instead of a member requesting to observe a friend.

At step 504 the application subscribes to and monitors one or more gaming servers reserved for the game service members to determine if any of the member's friends are active in any of the VR games running on the one or more servers. The application may use the friends list to determine if any of those friends are active in the server or servers. At step 505, the application determines if there are one or more VR-active friends of the member currently engaged in a virtual reality environment. If there are currently no friends of the member that are actively engaged in a VR environment, then the process may skip to step 507 where the member's friend list is updated to remove any indications that friends are active. The process may then end for that member at step 508. The member may see the status (dynamic data) of VR-active friends on the custom game page of the member.

If the application determines there are one or more friends of the member active in a VR environment, then the process may move to step 506 where the application may flag or mark the VR-active friends in the member's list. The application may update the friends list of the member at step 507. The process may then end for that member in step 508. The member may see this data (active or no) on his or her custom gaming page for each friend. Additional data may also be made available to the member such as which games the friends are active in and how long have they have been active at the time of update. The added information may be useful for the member to determine which friend to follow if any.

Figure 6:
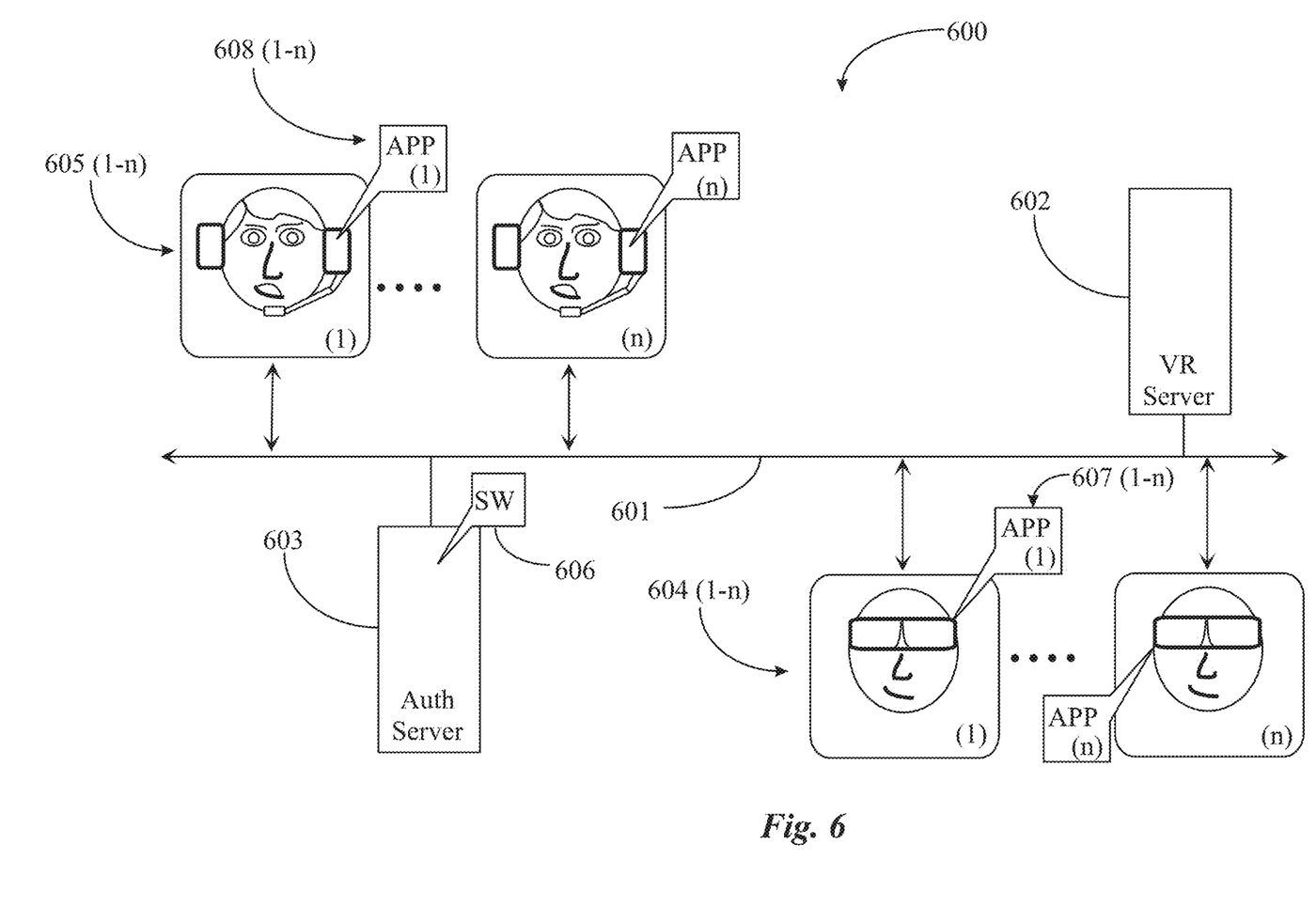
FIG. 6 is an architectural overview of a training network supporting active observation by an individual or a group of subject activities in a virtual environment.

FIG. 6 is an architectural overview of a training network 600 supporting active observation by an individual or a group of a subject's activities in a virtual environment. Training network 600 may include a network backbone 601 of a wide area network (WAN), or a local area network (LAN). In this implementation a virtual reality (VR) environment server 602 has connection to backbone 601. Server 602 may be adapted to server training modules that are VR training sequences such as may be used to train soldiers, police, first responders, sports professionals, etc. Server 602 may be hosted by a training entity of an enterprise, or by an enterprise that provides virtual reality environment training.

Backbone 601 supports an authentication (auth) server 603. Authentication server 603 may be adapted by SW 606 to authenticate training subjects such as training subjects 604 (1-n). In this implementation subjects 604 (1-n) may each have a computing station connected to backbone 601 and are wearing VR glasses or goggles or other implements that might be used to provide display and data input into a virtual environment.

In one embodiment subjects 604 (1-n) are operating or at least benefiting from running training applications 607 (1-n) that may be adapted to enable special log-in for training and connection with the VR server and personal equipment used by the subjects to provide input data as they navigate through a VR environment. One with skill in the art of virtual reality training systems will appreciate a variety of 3 D visualizing systems and input devices may be used to engage a VR environment without departing from the spirit and scope of the present invention.

In this embodiment there are observers 605 (1-n) operating at work stations connected to backbone 601. Observers 601 (1-n) may be a group or pool of agents charged with the responsibility of observing training subjects 604 (1-n) while they are actively engaged in a VR training session with server 602. Observers 605 (1-n) may be operating computing terminals or workstations connected to backbone 601 and may wear headsets for audio, a voice microphone for vocalizing, and a display or goggles, etc. for viewing their VR environment.

In general use of the invention according to this embodiment, one or more subjects 604 (1-n) may log-in for training at server 603 running SW 606. SW 606 may be adapted to connect each VR training subject 604 (1-n) to VR server 602 for a VR training session. Observers 605 (1-n) may have a VR client application 608 (1-n) executed and running on the observer's LAN-connected terminal with display and audio capabilities enabling the observers to see from a vantage point associated with what the training subject observed sees whether or not an avatar is used.

In one embodiment SW 606 may select from available observers based on availability and route selected ones into a VR session with one or more training subjects engaged. For example, training subject 604 (n) may log-into server 603 and report for a scheduled VR session. Before the session begins, SW 606 may look for at least one observer that may be available to observe the VR session once subject 604 (n) is engaged in training. SW 606 may select observer 605 (n) if the observer is available and not engaged in observing another training subject. In that case the SW may consider the observer unavailable and select another that is not currently busy.

It is noted herein that one or more than one observer may be assigned or selected to observe one or more training sessions where the observers see and hear essentially what the training subject sees and hears. Observer visual vantage points may be different than that of the training subject such as just behind, just above, or just to the side of the training subject. Observers 605 (1-n) like observers 118 and 119 of FIG. 1 may not have influence of the training subject in one embodiment, but may communicate with one another transparent from the subject in the event of more than one observer per training subject engaged.

In one implementation an observer may communicate perhaps in a limited fashion with a training subject through an established channel like text or voice. Limits may be imposed upon the amount of communication and whether or not the training subject may communicate back to one or more observers over the channel. In one implementation one or more observers 605 (1-n) may while observing note specific observations relative to the training subject and performance and generate an observer report that may rate or in some way assess the performance of the training subject's engagement with the VR environment. Such a report may be communicated to a training subject post session such as through email.

It is noted herein that observers and training subjects may be remote from one another connecting to a larger network such as the Internet network through any sub-carrier networks capable of bridging to the Internet. It is also noted herein that the invention may be practiced within the confines of a LAN network without departing from the spirit and scope of the invention.

Figure 7:
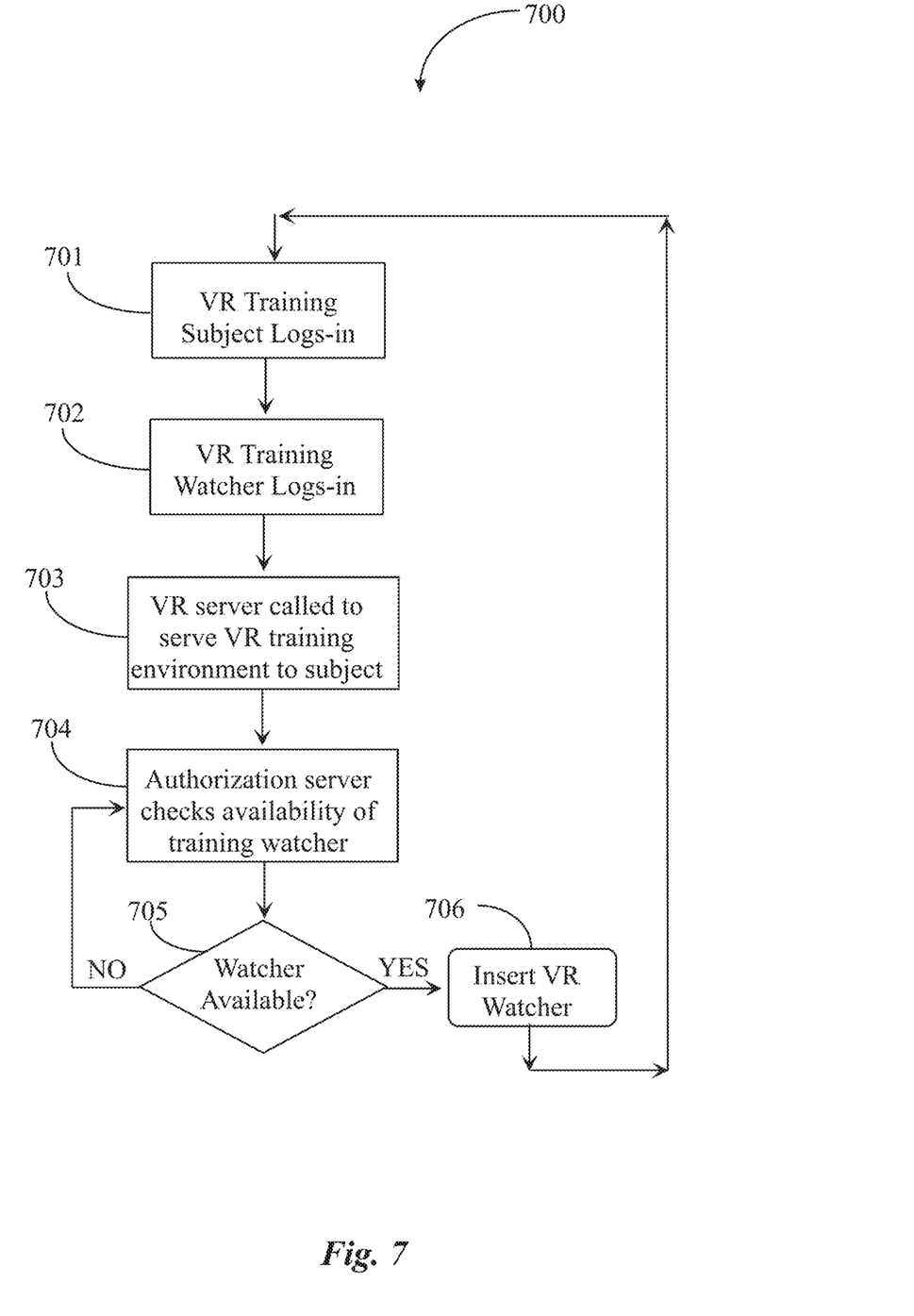
FIG. 7 is a process flow chart depicting steps for assigning one or more observers to observe subject activities within a virtual environment.

FIG. 7 is a process flow chart 700 depicting steps for assigning one or more observers to observe subject activities within a virtual environment. At step 701, a VR training subject logs into an authentication server in order to authenticate for a scheduled or impromptu training session. At step 702 a VR training observer logs into the authentication server in order to authenticate for the purpose of observing the VR training session. It may be important to note in this example that there may be several or a pool of observers some may be currently logged into the system while others may not.

At step 703 the VR server is called by SW analogous to SW 606 of FIG. 6 to engage the training subject in a specific 3D VR training session. In this system it may be that the only time a subject logs into the authentication server is to authenticate for a scheduled or unscheduled training session. At step 704, the authorization server aided by SW 606 may check for current availability of a training observer to observe a new training subject going into a training session at the server. Step 704 may involve checking the real time availability of an observer associated with a pool of observers that are logged into the server and if available, routing the observer to the VR session hosted by the server.

At step 705 it may be determined by SW (routing) whether there is an observer available to observe a training subject about to enter a VR training session. At step 705 if it is determined that no qualified observer is currently available such as all observers are currently busy, then the process may loop back to step 704 until a observer becomes available. A VR training subject may be required to pause before active VR streaming until an observer is present and may receive the observer stream of the same VR training session.

If it is determined that an observer is available at step 705, the SW may route the observer (build server connection) to the VR training session as a passive or as a contributing observer of a training subject engaged in the VR session. The observer has no utility in the session and cannot do more than observe and perhaps have limited vocal or text input to the VR training subject. The configuration may depend at least in part on the type of training and business model. In one implementation if no observer is available there may be an estimated waiting time (ETW) informing a waiting training subject when one may be available for the session.

In one embodiment the training subject may be an avatar in the session and the observer may be passively connected to a visual camera vantage point to at least see if not also hear what the training subject sees and hears albeit it may be from a slightly different vantage point associated with the avatar than the visual vantage point of the avatar itself (subject vantage point). In another embodiment the visual vantage point of the avatar (what the training subject sees) is shared with one or more observers in real time. In one implementation such as for example target training where a training subject is a sniper and the subjects view is down range from the actual targets, the observers may have a vantage point not associated with the trainer but associated much closer to the targets for close up visualization of those virtual targets. Other examples may call for different visual vantage points for observers.

In another aspect of the invention, rather than enabling observers directly into a VR game, as described in enabling detail above, wherein observers are non-player participants in a game being played by a player, a player may be enabled to elect to record his or her play of a game as a video in a manner that the recording may be, in one aspect, saved, either on a server side, if the game is being served from an on-line game server to a player using a network-connected platform, or on the client side, if the game is stored and served locally. In one embodiment the recording may be saved on the client side in any case.

If saved on the server side the recording may be associated with a URL, which may be provided to third parties to access and play the recorded 3D video. If on the client side, the recorded 3D video may be provided to third parties in a variety of different ways. The recordings may, for example, be accessible through a file transfer service, or may be uploaded to a video presentation venue, such as Vimeo, for example. And there are other ways know in the art to disseminate such media files to interested parties.

In another aspect the video stream produced if a player elects to record a play session in a game may be created and streamed in near real time to selected third parties. In this aspect the third party observer will be selected, or pre-selected by the player, and may receive a link to be able to watch the video being created as the player plays the game. In another aspect third-party observers may opt in on an enterprise site and elect to be observers, and may select games to observe, or players to observe in games. In this aspect a player engaged in a game may be alerted to the intent of an observer, and may be enabled to deny observation.

In either case described above, whether recorded, saved and disseminated, or streamed in near real time, the resulting video may or may not be enabled with 3D information from the game engine that enables the consumer of the video, the observer, to have and control a 3D direction-variable viewpoint at least from the position of the player in the game. If the recording is a video just of the player's experience, an observer will see what the player saw in playing the game, from the player's viewpoint. If, however, 3D panning is enabled for the recording (or streaming), then the game engine will gather 3D data in addition to the player's view, and an observer will be able to pan the view from the position of the player in essentially all directions. The player, however, is constrained, as is common, to his or her player's viewpoint, which changes with the player's manipulative input, as is commonly known in playing a VR game.

Figure 8:
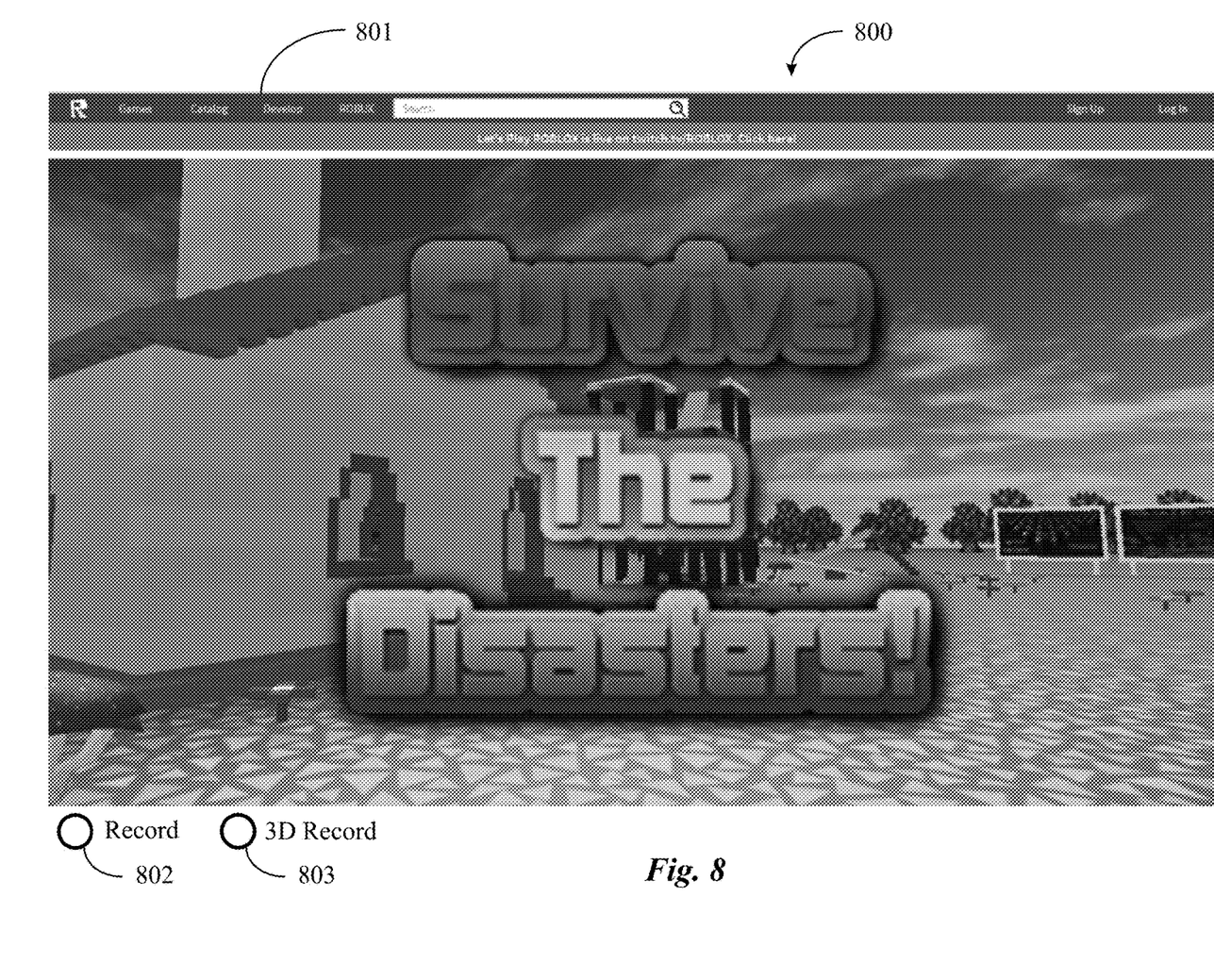
FIG. 8 is an example of a display 800 produced on a display screen to a player in a VR game in an embodiment of the invention.

FIG. 8 is an example of a display 800 produced on a display screen to a player in a VR game. There is a command line 801, through which a player may access information and commands. In this example, a toggle radio button 802 is provided in a lower, left corner below the display, enabling the player to toggle the video record function on and off in an embodiment of the invention. The radio button could be overlaid in a part of the game display as well, and the on-off function, and even more configuration, such as an automatic time, or other constraints might be available through a drop-down menu from command line 801. There are variety of ways the player may be enabled to configure and control the record function. In one embodiment a second radio button 803 may be provided, or a second command input elsewhere, enabling the recorded or streamed video to provide 3D panning for an observer from the viewpoint of the player.

Figure 9:
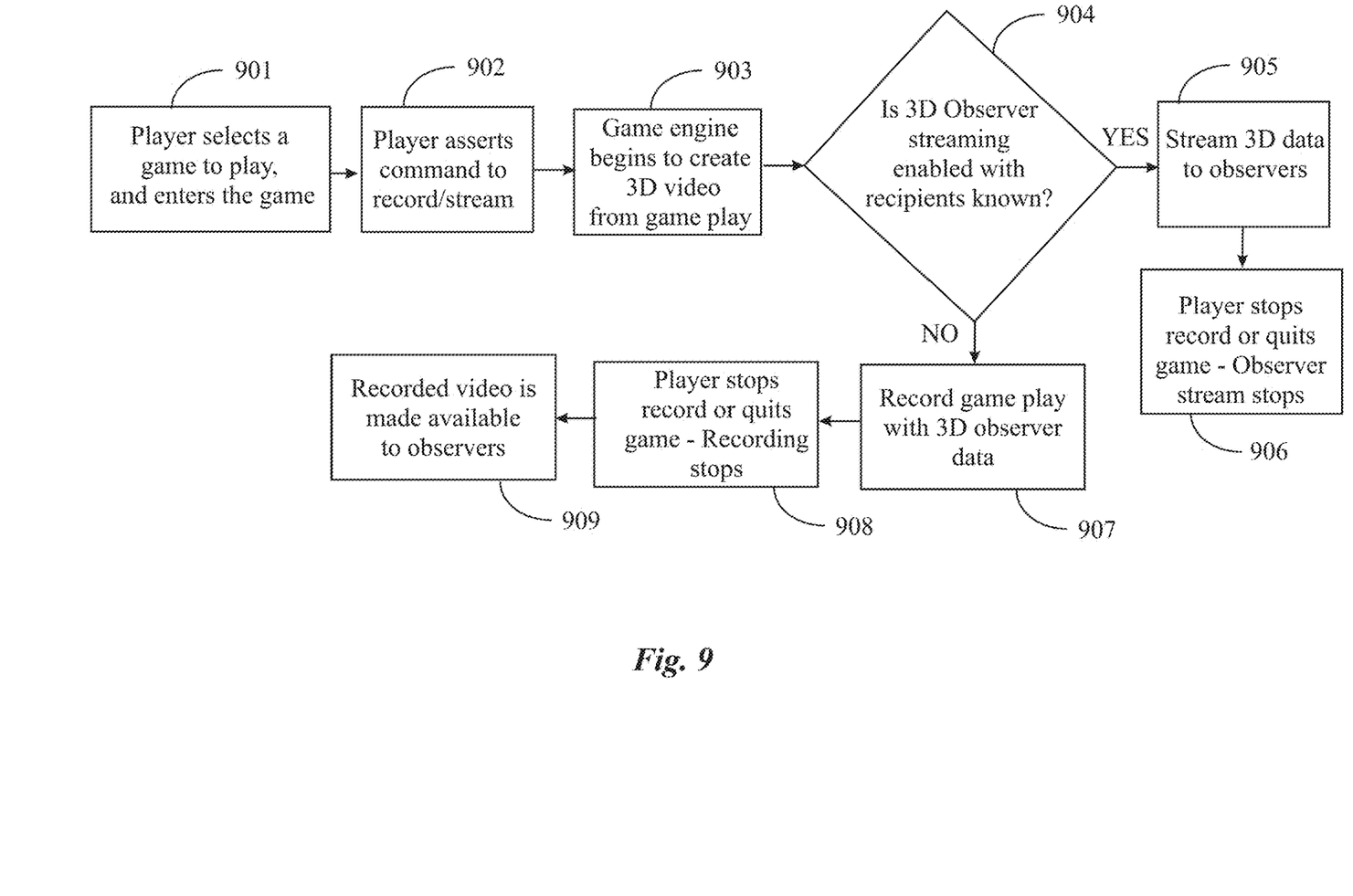
FIG. 9 is a flow diagram describing a process in an embodiment of the invention.

FIG. 9 is a flow diagram describing a process wherein a player plays a game streamed from either a game server on a network, such as the Internet network, or from a more local data repository, and the game engine enables the player to record his or her play along with 3D data to enable a third party observer to follow the play session with an ability to pan in other directions than the player's viewpoint.

At step 901 a player enters a game, in this example called "Survive the Disasters". At step 902 the player clicks on the Record or the 3D record button seen in FIG. 8. This input might also be by any of a variety of other mechanisms, such as from a drop-down menu. At step 903, in response to the player's "record" input, the game engine begins preparing a video, either just the player's experience or with 3D panning ability, from the data streamed in the player's game. The 3D video, as described above, includes in one embodiment data enabling a consumer of the video to pan in 3D in the video from the position of the player in the game environment.

At step 904 the system determines whether or not near real-time observers have been enabled to receive the 3D video as a data stream as the video is being prepared, and possibly also recorded. If YES, at step 905 the 3D video is streamed to the enabled observers. As also described above, in one embodiment observers may elect to observe, and may select a player or a game, or both, and the player engaged in the game may be alerted, and may be enabled to deny access to the potential observer(s). Following step 905, at step 906, if the player in the game stops recording, or quits the game, the observer stream, and the recording stream stop.

If at step 904 it is determined that observer streaming is not enabled, then at step 907 the game play is recorded as a video, which may be with 3D panning enabled, and may be stored locally, or in a data repository on the server side, if the game is being streamed from a network-connected game server. At step 908, when the player elects to stop recoding, or quits the game, the recording also stops. At step 909 recorded video may be made available to observers in any of a variety of ways, at least partially depending on where and how the 3D video is recorded.

In one embodiment of the invention additional configuration is made available to the player to provide 3D data, for example, from a viewpoint other than the viewpoint position of the player. A player, or in some embodiments an administration person with the enterprise providing the game service, may enable an additional viewpoint, such as, for example, ten feet above and behind the player's position in the game. Then a second set of data is recorded or streamed, and it may or may not be enabled for 3D panning. If not panning-enabled, then an observer may view the player's experience with a direction the same as the player, but from the new viewpoint enabled. If enabled for 3D panning, that video allows the observer to pan around in different directions from the new viewpoint position tied to, but different than the player's viewpoint position.

In some embodiments observers may be enabled to pan around a viewpoint position, such as, for example, by click-and-drag with a cursor input, or may use another enabled input, and may have a different input allowing the observer to switch between different viewpoint positions in a 3D video.

In at least one embodiment of the invention the software executing at a portal site of the enterprise hosting games, may enable an administrator to manage and control video recording functions, such that the administrator may select games and players, and may configure streaming and recording functions, and may also manage distribution of ability to view video to observers, transparently to players. In this embodiment player's may be asked to authorize such recording and dissemination of video of the player' activity at the gaming site.

It will be apparent to one with skill in the art that the virtual reality environment system of the invention may be provided using some or all of the described features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

It will be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

The invention claimed is:

1. A virtual reality (VR) system, comprising:
   a server coupled to a data repository and having a processor that executes software from a non-transitory storage medium;
   a VR game stored in the data repository; and
   a first computerized appliance having a display screen, in communication with the server over the network,
   wherein the server streams first data to the first computerized appliance, and accepts inputs from a first user of the first computerized appliance,
   wherein the inputs enable the first user of the first computerized appliance to engage in the VR game to control an avatar with a variable position and viewpoint, and to interact with virtual objects in the VR game,
   wherein the server streams second data to a second computerized appliance having a display screen to enable a second user of the second computerized appliance to view activity of the avatar controlled by the first user of the first computerized appliance in the VR game as a passive observer,
   wherein the server enables the second user to select to view the activity from a same viewpoint as a viewpoint of the avatar controlled by the first user of the first computerized appliance or from one or more viewpoints distinct from the viewpoint of the avatar,
   wherein the one or more distinct viewpoints are configurable by the second user of the second computerized appliance and allow the second user of the second computerized appliance to pan around a position of the avatar while the first user of the first computerized appliance is provided with a view that looks ahead from the viewpoint of the avatar during the VR game, wherein the second user of the second computerized appliance is one of a plurality of second users of respective second computerized appliances, and each of the second users has a respective distinct viewpoint to view the activity of the avatar, wherein the server enables the second user to specify a condition under which the second user is allowed to view the activity of the avatar as the passive observer, dependent on availability of at least another second user of the plurality of second users to view the activity of the avatar as the passive observer, and wherein the server provides the second users of the second computerized appliances with no control over movement of the avatar or the virtual objects in the VR game.

2. The VR system of claim 1, wherein the second data streamed by the server is a video data stream.

3. The VR system of claim 1 wherein the second data stream is prepared as a video data stream, and is recorded in a data repository rather than being streamed directly to the second computerized appliance.

4. The VR system of claim 3 wherein the recorded video data stream is shared with a plurality of second computerized appliances.

5. The VR system of claim 2, wherein the server enables the second user to limit communication with the first user of the first computerized appliance while following as the passive observer, and wherein the server further enables the first user of the first computerized appliance to exclude communication capability of any of the second users while following as passive observers.

6. The VR system of claim 5, wherein the limited communication comprises verbal input to the first user of the first computerized appliance.

7. The VR system of claim 5, wherein the limited communication comprises textual input to the first user of the first computerized appliance.

8. The VR system of claim 1, wherein the server enables the second user of the second computerized appliance to change a selected viewpoint in the VR game, and wherein the selected viewpoint is constrained to a position of the avatar in the VR game.

9. The VR system of claim 1, wherein server enables the second user of the second computerized appliance to change a selected viewpoint during the VR game to look ahead in a direction that the avatar moves in the VR game or to look back to where the avatar has been in the VR game.

10. The VR system of claim 1, wherein the server stores and serves a plurality of VR games for user selection, maintains user profiles, including friend relationships, and presents a list to the second user of the second computerized appliance that identifies one or more friends of the second user of the second computerized appliance, wherein the list identifies a first friend amongst the one or more friends of the second user of the second computerized appliance as the first user, and wherein the server enables the second user of the second computerized appliance to select the VR game where the first friend is playing, and to elect to follow that first friend as the passive observer.

11. The VR system of claim 10, wherein the server alerts the second user when one of the second user's friends enters a particular VR game at the server, and enables the second user to elect to enter the particular VR game where the second user's friend is playing.

12. The VR system of claim 1, wherein the server enables the first user of the first computerized appliance to deny observation by any of the second users.

13. The VR system of claim 1, wherein the server enables the first user of the first computerized appliance to limit observation by any of the second users.

14. A method performed by a server in a virtual reality (VR) system, the method comprising:

streaming first data, pertaining to a VR game supported by the server, to a first computerized appliance, and accepting inputs from a first user of the first computerized appliance, wherein the inputs enable the first user of the first computerized appliance to engage in the VR game to control an avatar with a variable position and viewpoint, and to interact with virtual objects in the VR game;

streaming second data to a second computerized appliance having a display screen to enable a second user of the second computerized appliance to view activity of the avatar controlled by the first user of the first computerized appliance in the VR game as a passive observer;

enabling the second user to select to view the activity from a same viewpoint as a viewpoint of the avatar controlled by the first user of the first computerized appliance or from one or more viewpoints distinct from the viewpoint of the avatar, wherein the one or more distinct viewpoints are configurable by the second user of the second computerized appliance and allow the second user of the second computerized appliance to pan around a position of the avatar while the first user of the first computerized appliance is provided with a view that looks ahead from the viewpoint of the avatar during the VR game, and wherein the second user of the second computerized appliance is one of a plurality of second users of respective second computerized appliances, and each of the second users has a respective distinct viewpoint to view the activity of the avatar; and enabling the second user to specify a condition under which the second user is allowed to view the activity of the avatar as the passive observer, dependent on availability of at least another second user of the plurality of second users to view the activity of the avatar as the passive observer, and wherein the server provides the second users of the second computerized appliances with no control over movement of the avatar or the virtual objects in the VR game.

* * * * *

UNITED STATES PATENT AND TRADEMARK OFFICE
CERTIFICATE OF CORRECTION

PATENT NO. : 11,058,945 B2
APPLICATION NO. : 15/296485
DATED : July 13, 2021
INVENTOR(S) : Humadi It is certified that error appears in the above-identified patent and that said Letters Patent is hereby corrected as shown below:

In the Claims

In Column 16, Line 44, in Claim 1, please delete "the network" and insert -- a network -- therefor.

Signed and Sealed this
Nineteenth Day of April, 2022

Katherine Kelly Vidal
*Director of the United States Patent and Trademark Office*